US 12,506,655 B2

(12) United States Patent
Bott

(10) Patent No.: US 12,506,655 B2
(45) Date of Patent: Dec. 23, 2025

(54) PROVISIONING CONTROL APPARATUS AND METHOD FOR PROVISIONING ELECTRONIC COMPONENTS OR DEVICES

(71) Applicant: Secure Thingz Ltd., Cambridge (GB)

(72) Inventor: Andrew Bott, Cambridge (GB)

(73) Assignee: Secure Thingz Ltd., Cambridge (GB)

( * ) Notice: Subject to any disclaimer, the term of this patent is extended or adjusted under 35 U.S.C. 154(b) by 250 days.

(21) Appl. No.: 17/961,760

(22) Filed: Oct. 7, 2022

(65) Prior Publication Data

US 2023/0115496 A1   Apr. 13, 2023

(30) Foreign Application Priority Data

Oct. 7, 2021   (EP) .................................... 21201352

(51) Int. Cl.
*H04L 41/0806* (2022.01)
*H04L 9/08* (2006.01)
*H04L 9/32* (2006.01)

(52) U.S. Cl.
CPC ........ *H04L 41/0806* (2013.01); *H04L 9/0825* (2013.01); *H04L 9/0833* (2013.01);
(Continued)

(58) Field of Classification Search
CPC . H04L 41/0806; H04L 9/0825; H04L 9/0833; H04L 9/0897; H04L 9/3234; H04L 9/3263

See application file for complete search history.

(56) References Cited

U.S. PATENT DOCUMENTS 10,326,797 B1 * 6/2019 Murray ................. H04L 9/0825
2013/0080764 A1 * 3/2013 Khosravi ............... H04L 9/0822
713/150

(Continued)

OTHER PUBLICATIONS

Search Report from corresponding European Application No. 21201352. 8, Mar. 28, 2022.

(Continued)

*Primary Examiner* — Taghi T Arani
*Assistant Examiner* — Joshua Raymond White
(74) *Attorney, Agent, or Firm* — Workman Nydegger

(57) ABSTRACT

A provisioning control apparatus is configured to be coupled to a provisioning equipment server, wherein the provisioning equipment server is electrically connectable with one or more electronic devices for provisioning the electronic devices with security sensitive provisioning data. The provisioning control apparatus includes a processor configured to generate a group context for sharing the group context with a first further provisioning control apparatus for creating a group of provisioning control apparatuses. The group context includes a group private key, a certificate for the group private key and a group encryption key used for encryption and/or decryption and the first further provisioning control apparatus is configured to be coupled to the provisioning equipment server. The processor is configured to generate the security sensitive provisioning data based on the group context. The provisioning control apparatus includes a communication interface configured to provide the security sensitive provisioning data to the provisioning equipment server.

14 Claims, 5 Drawing Sheets

(52) U.S. Cl.
CPC .......... *H04L 9/0897* (2013.01); *H04L 9/3234* (2013.01); *H04L 9/3263* (2013.01)

(56) References Cited

U.S. PATENT DOCUMENTS

| | | |
|---|---|---|
| 2020/0021430 A1 | 1/2020 | Grubin et al. |
| 2020/0059373 A1* | 2/2020 | Norum .................. H04L 9/0897 |
| 2023/0108261 A1* | 4/2023 | Elkins ..................... H04L 63/18 |
| | | 713/171 |

OTHER PUBLICATIONS

Savaro De Souza, et al., "Audit and backup procedures for hardware security modules," Proceedings of the 7th Symposium on Identity and Trust on the Internet, Mar. 4, 2008, 9 pages.

* cited by examiner

PROVISIONING CONTROL APPARATUS AND METHOD FOR PROVISIONING ELECTRONIC COMPONENTS OR DEVICES

TECHNICAL FIELD

The invention relates to the secure production and provisioning of electronic components or devices. More specifically, the invention relates to an apparatus and a method for controlling the provisioning of electronic components or devices.

BACKGROUND OF THE INVENTION

The production and assembly of state-of-the-art electronic equipment, such as smartphones, tablet computers as well as other types of electronic consumer or IoT equipment, often happens in a distributed fashion in that the various electronic components or devices, including the electronic chips of electronic consumer equipment are manufactured, provisioned or personalized and finally assembled at different locations and by different parties. For instance, an electronic chip for an electronic equipment may be originally manufactured by a chip manufacturer and provisioned by another party with security sensitive provisioning data, such as cryptographic keys and/or a firmware, before being assembled into the final end product by the manufacturer of the electronic equipment, e.g. an OEM. A similar problem may arise in in-system programming (ISP), also called in-circuit serial programming (ICSP), where electronic components may be programmed, i.e. provided with security sensitive provisioning data, while already installed in an electronic equipment, rather than requiring the electronic component, e.g. electronic chip, to be programmed prior to installing it into the electronic equipment.

For provisioning electronic components or devices with security sensitive provisioning data by a third party it is known to use a provisioning control apparatus in the form of a secure hardware security module (HSM). Often the security sensitive provisioning data may contain or be based on OEM keys securely stored and/or processed by such a secure HSM. If there is a failure or malfunction of such a secure HSM, for instance, due to physical damage caused by a factory fire or a fork-lift truck damaging the HSM these OEM keys might be lost due to the secure nature of the HSM. Any backups of the OEM keys from such a secure HSM cannot be recovered onto a replacement HSM due to the secure nature of the system. The result would be that the factory line would have to stop provisioning electronic components until a new secure HSM has been installed and the OEM secret keys have been wrapped for the new secure HSM, resulting in significant delay and cost in manufacturing.

Thus, there is a need for improved apparatuses, in particular HSMs, and methods for controlling the secure provisioning of electronic components or devices, such as chips or microprocessors, for electronic equipment in a fail-safe manner.

SUMMARY OF THE INVENTION

It is therefore an object of the invention to provide improved apparatuses, in particular HSMs, and methods for controlling the secure provisioning of electronic components or devices, such as chips or microprocessors, for electronic equipment in a fail-safe manner.

The foregoing and other objects are achieved by the subject matter of the independent claims. Further implementation forms are apparent from the dependent claims, the description and the figures.

According to a first aspect, a provisioning control apparatus, in particular a secure HSM, configured to be coupled to a provisioning equipment server is provided. As will be described in more detail below, the provisioning control apparatus according to the first aspect may be considered as a root or parent provisioning control apparatus. The provisioning equipment server is electrically connectable with one or more electronic components for provisioning the one or more electronic components with security sensitive provisioning data.

The electronic components may comprise chips, microprocessors or other programmable electronic components, such as Flash memories, application processors, memory control units (MCUs), electrically erasable programmable read only memories (EEPROM), programmable logic devices (PLDs), field programmable gate arrays (FPGAs), systems-on-chip (SoC), and microcontrollers incorporating non-volatile memory elements.

The provisioning control apparatus comprises one or more processors configured to generate a group context for sharing the group context with a first further provisioning control apparatus for creating a group of provisioning control apparatuses, wherein the first further provisioning control apparatus is configured to be coupled to the provisioning equipment server) for provisioning the electronic devices with security sensitive provisioning data. The group context comprises a group private key, a certificate for the group private key and a group encryption key used for encryption and/or decryption.

The one or more processors are further configured to generate the security sensitive provisioning data based on the group context. The provisioning control apparatus further comprises a communication interface configured to provide the security sensitive provisioning data to the provisioning equipment server.

Thus, a failure of the provisioning control apparatus can be compensated by the first further provisioning control apparatus in that the first further provisioning control apparatus may continue provisioning the one or more electronic components with security sensitive provisioning data.

In an embodiment, the communication interface is further configured to provide the group context to the first further provisioning control apparatus. The communication interface may provide a wired or wireless connection between the provisioning control apparatus and the first further provisioning control apparatus.

In an embodiment, the communication interface is further configured to receive one or more wrapped, e.g. encrypted OEM keys from an OEM server and the processor is configured to unwrap the one or more wrapped OEM keys based on the group context, e.g. the group private key or the group encryption key and to generate the security sensitive provisioning data based on the one or more OEM keys.

In an embodiment, the one or more OEM keys comprise an OEM certificate and the processor is configured to generate the security sensitive provisioning data based on the OEM certificate. In an embodiment, the security sensitive provisioning data may comprise the OEM certificate or a certificate derived from the OEM certificate.

In an embodiment, the communication interface is further configured to provide the group context to a remote security server for generating a proxy provisioning control apparatus, e.g. a proxy HSM on the remote security server. The proxy provisioning control apparatus, e.g. proxy HSM is configured to provide the group context to a second further provisioning control apparatus for enrolling the second further provisioning control apparatus for the group of provisioning control apparatuses, wherein the second further provisioning control apparatus is configured to be coupled to the provisioning equipment server.

In an embodiment, the processor is further configured to assign an identity to the first further provisioning control apparatus, wherein the identity of the first further provisioning control apparatus is indicative of the provisioning control apparatus and the first further provisioning control apparatus. In an embodiment, the communication interface is configured to provide the identity to the first further provisioning control apparatus.

In an embodiment, the processor is further configured to assign an identity to a second further provisioning control apparatus, wherein the identity of the second further provisioning control apparatus is indicative of the provisioning control apparatus and the second further provisioning control apparatus.

According to a second aspect, a provisioning control apparatus, in particular a secure HSM, configured to be coupled to a provisioning equipment server is provided. As will be described in more detail below, the provisioning control apparatus according to the second aspect may be considered as a child provisioning control apparatus. The provisioning equipment server is electrically connectable with one or more electronic components for provisioning the one or more electronic components with security sensitive provisioning data.

The provisioning control apparatus according to the second aspect comprises a communication interface configured to receive a group context from a first further provisioning control apparatus for creating a group of provisioning control apparatuses. The group context comprises a group private key, a certificate for the group private key and a group encryption key used for encryption and/or decryption. The provisioning control apparatus according to the second aspect further comprises a processor configured to generate the security sensitive provisioning data based on the group context. The communication interface is further configured to provide the security sensitive provisioning data to the provisioning equipment server.

Thus, a failure of the first further provisioning control apparatus can be compensated by the provisioning control apparatus according to the second aspect in that the provisioning control apparatus according to the second aspect may continue provisioning the one or more electronic components with security sensitive provisioning data.

In an embodiment, the communication interface is further configured to receive one or more wrapped OEM keys from the remote OEM server and the processor is configured to unwrap the one or more wrapped OEM keys based on the group context and to generate the security sensitive provisioning data based on the one or more OEM keys.

In an embodiment, the one or more OEM keys comprise an OEM certificate and the processor is configured to generate the security sensitive provisioning data based on the OEM certificate. In an embodiment, the security sensitive provisioning data may comprise the OEM certificate or a certificate derived from the OEM certificate.

In an embodiment, the communication interface is further configured to provide the group context to a remote security server for generating a proxy provisioning control apparatus, e.g. a proxy HSM on the remote security server. The proxy provisioning control apparatus, e.g. proxy HSM is configured to provide the group context to a second further provisioning control apparatus for enrolling the second further provisioning control apparatus for the group of provisioning control apparatuses, wherein the second further provisioning control apparatus is configured to be coupled to the provisioning equipment server for provisioning the electronic devices with the security sensitive provisioning data.

In an embodiment, the communication interface is further configured to provide the group context to a second further provisioning control apparatus for enrolling the second further provisioning control apparatus in the group of provisioning control apparatuses, wherein the second further provisioning control apparatus is configured to be coupled to the provisioning equipment server for provisioning the electronic devices with the security sensitive provisioning data.

In an embodiment, the communication interface is further configured to receive an identity from the first further provisioning control apparatus, wherein the identity of the provisioning control apparatus is indicative of the provisioning control apparatus and the first further provisioning control apparatus.

In an embodiment, the processor is configured to assign an identity to the second further provisioning control apparatus, wherein the identity of the second further provisioning control apparatus is indicative of the provisioning control apparatus, the first further provisioning control apparatus and the second further provisioning control apparatus.

According to a third aspect a provisioning system is provided, wherein the provisioning system comprises a provisioning control apparatus according to the first aspect, a provisioning control apparatus according to the second aspect, and a provisioning equipment server being electrically connectable with one or more electronic devices for provisioning the one or more electronic devices with the security sensitive provisioning data.

According to a fourth aspect a method is provided for operating a provisioning control apparatus configured to be coupled to a provisioning equipment server, wherein the provisioning equipment server is electrically connectable with one or more electronic devices for provisioning the one or more electronic devices with security sensitive provisioning data. The method comprises the steps of:

generating a group context for sharing the group context with a first further provisioning control apparatus for creating a group of provisioning control apparatuses, wherein the group context comprises a group private key, a certificate for the group private key and a group encryption key used for encryption and/or decryption and wherein the first further provisioning control apparatus is configured to be coupled to provisioning equipment server;

generating the security sensitive provisioning data based on the group context; and providing the security sensitive provisioning data to the provisioning equipment server.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
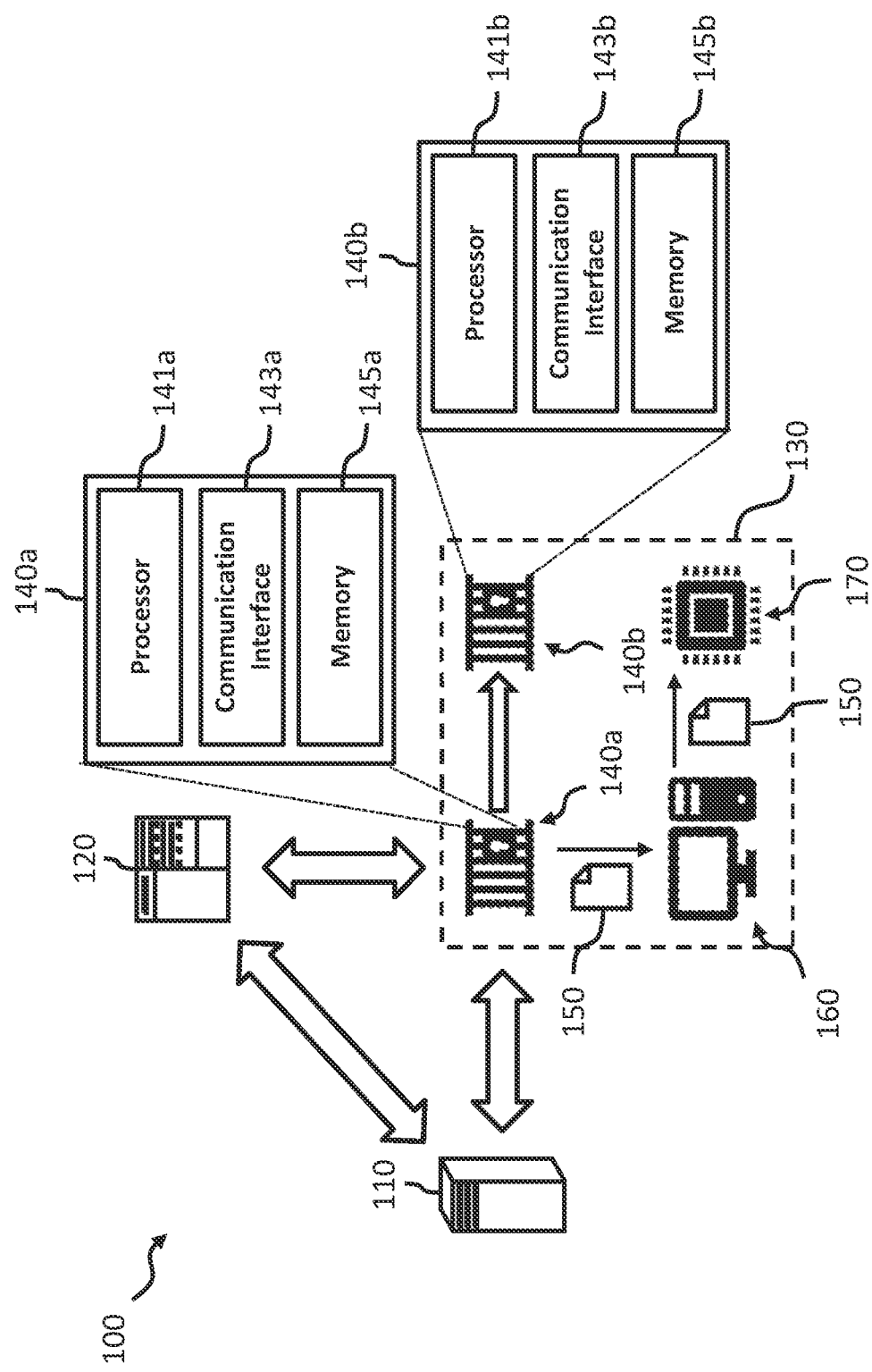
FIG. 1 shows a schematic diagram illustrating a provisioning system including a provisioning control apparatus according to an embodiment of the invention.

FIG. 1 shows a schematic diagram of a provisioning system 100 according to an embodiment of the invention, including a first or initial provisioning control apparatus 140a according to an embodiment of the invention. In an embodiment, the first or initial provisioning control apparatus 140a may be implemented as a first or initial secure HSM 140a.

As will be described in more detail further below, the provisioning system 100 may comprise in addition to the first secure HSM 140a a remote server 110, a security server 120 and a provisioning equipment server 160 for provisioning or personalizing electronic devices or components 170, such as chips or microprocessors 170 with security sensitive provisioning data 150, such as secret electronic keys, certificates and/or configuration data. As illustrated in FIG. 1, the first secure HSM 140a, the remote server 110 and the security server 120 may be configured to communicate with each other via a communication network, such as the Internet. Thus, the first secure HSM 140a, the remote server 110 and the remote security server 120 may be at different locations and under the control of different entities. As illustrated in FIG. 1, the first secure HSM 140a and the provisioning equipment server 160 may be located within a production environment 130, such as a personalization factory 130. In an embodiment, the remote server 110 may be under the control or associated with an electronic equipment manufacturer, e.g. an OEM, wherein the electronic equipment manufacturer assembles electronic equipment, such as smartphones, tablet computers or other types of IoT or electronic consumer equipment, using the electronic devices or components 170 provisioned by the provisioning equipment server 160 with the security sensitive provisioning data 150. In an embodiment, at least a portion of the security sensitive provisioning data 150 may include a firmware and/or secret electronic keys of the electronic equipment manufacturer associated with the remote OEM server 110.

In an embodiment, the first secure HSM 140a, the remote OEM server 110 and the remote security server 120 are configured to securely communicate with each other using one or more cryptographic schemes, such as a public key infrastructure and/or a hybrid cryptographic scheme. In an embodiment, the first secure HSM 140a may be under the remote control of the security server 120.

The first secure HSM 140a is configured to be coupled to the provisioning equipment server 160, for instance, by a wired or a wireless connection. In an embodiment, the provisioning equipment server 160 may be implemented as a personal computer (PC) and the first secure HSM 140a may be implemented as a PC card inserted in the provisioning equipment server 160. The provisioning equipment server 160 may comprise an electrical and/or mechanical interface for interacting directly or indirectly via a provisioning equipment with the electronic devices or components 170. For instance, the provisioning equipment server 160 may comprise a personalization tray for personalizing a batch of electronic devices or components 170 inserted therein.

In the embodiment illustrated in FIG. 1 the first secure HSM 140a comprises a processor 141a, a communication interface 143a and a non-transient memory 145a. The processor 141a of the first secure HSM 140a may be configured to encrypt the security sensitive provisioning data 150 for obtaining encrypted security sensitive provisioning data 150. Moreover, the communication interface 143a of the first secure HSM 140a may be configured to provide the encrypted security sensitive provisioning data 150 to the provisioning equipment server 160 for storing the encrypted security sensitive provisioning data 150 in a non-volatile memory, e.g. a Flash memory of the electronic device or component 170. In an embodiment, the security sensitive provisioning data 150 may comprise one or more electronic keys, one or more certificates and/or configuration data, i.e. data defining one or more security configurations of the electronic device or component 170, in particular register settings.

As will be described in more detail below under further reference to FIG. 2, the first or initial secure HSM 140a is configured to generate a group of secure HSMs by enrolling one or more further secure HSMs 140b, 140c into the group of secure HSMs 140a-c. In an embodiment, all secure HSMs 140a-c may be provided by the same supplier and comprise one or more supplier certificates provided by a supplier public key infrastructure (PKI). This allows a particular secure HSM 140a-c to prove that it is a genuine product from the supplier by demonstrating it can sign using a key that is confirmed through a certificate chain that goes up to the root of trust certificate of the supplier.

As will be described in more detail below, for generating the group of secure HSMs and enrolling a new HSM into the group the first or initial secure HSM 140a is configured to generate a dataset (referred to herein as "secret group context"), which contains a top-level group private key used as a Certificate Authority (CA) for the group, i.e. the group identity and a certificate (for instance, a X.509 certificate) as the Group CA authority certificate. Moreover, the group context comprises a group encryption key used for encryption and/or decryption.

In an embodiment, the group encryption key may be a group encryption private key or a group encryption symmetric key. In case the group encryption key is a group encryption private key the group context may further comprise a certificate, for instance, a X.509 certificate for the corresponding group encryption public key.

In an embodiment, the group context may further comprise a group signature private key used for generating a digital signature and, thus, authentication as well as a certificate, for instance, a X.509 certificate for the corresponding group signature public key.

In an embodiment, the group context may further comprise additional cryptographic keys and corresponding certificates for other services.

As already described above, in an embodiment, the top-level group certificate of the group context chains back to a root certificate, for instance, the root certificate of the entity supplying the secure HSMs 140a-c. This allows to cryptographically prove that the group master key is genuine. This extra level of security makes it possible that the first secure HSM 140a does not have to release its own private key even to the other proven, i.e. authenticated secure HSMs 140b, 140c. The group master private key is to be given to the other HSMs in the group at a later stage, as will be described in more detail in the following.

As already described above and illustrated in FIG. 2, the first secure HSM 140a may initiate or be triggered to create a new group of secure HSMs 140a-c (see 201). In an embodiment, this results in new group certificate chain being created with the corresponding private keys. In an embodiment, the group certificates 203 may be extracted and used in place of a certificate of a single HSM for wrapping, i.e. encrypting the OEM keys 205. As illustrated in the embodiment of FIG. 2, these OEM keys 205 may be wrapped by the remote OEM server 110 for providing the wrapped OEM keys 207 to the group of secure HSMs 140a-c. As will be appreciated, the result of this wrapping operation is a set of keys that may be similar to the set for a single HSM, but can be shared with other secure HSMs by means of the group enrolment operations described in the following. In an embodiment, the OEM keys 207 may comprise an OEM certificate and the processor 141a is configured to generate the security sensitive provisioning data 150 based on the OEM certificate. In an embodiment, the security sensitive provisioning data 150 may comprise the OEM certificate or a certificate derived from the OEM certificate.

As will be described in more detail below, none of the secure HSMs 140a-c fulfills a kind of "king pin" position in that its failure or loss would result in a failure of the other secure HSMs as well. As a consequence thereof, not only the first secure HSM 140a available within the provisioning environment 130, but also any one of the other secure HSMs 140a-c already belonging to the group may enroll a further secure HSM into the group of secure HSMs.

For enrolling a further HSM into the group, which will be described in more detail in the context of FIG. 2, a secure communication should be used between the HSMs that are involved in the enrollment process. This may be achieved by the HSMs that are involved using a secure communication channel over the same network, such as a LAN or WLAN, or using a manual exchange of USB fobs, for instance, in case of a remote or disconnected further HSM to be enrolled into the group of secure HSMs.

Figure 2:
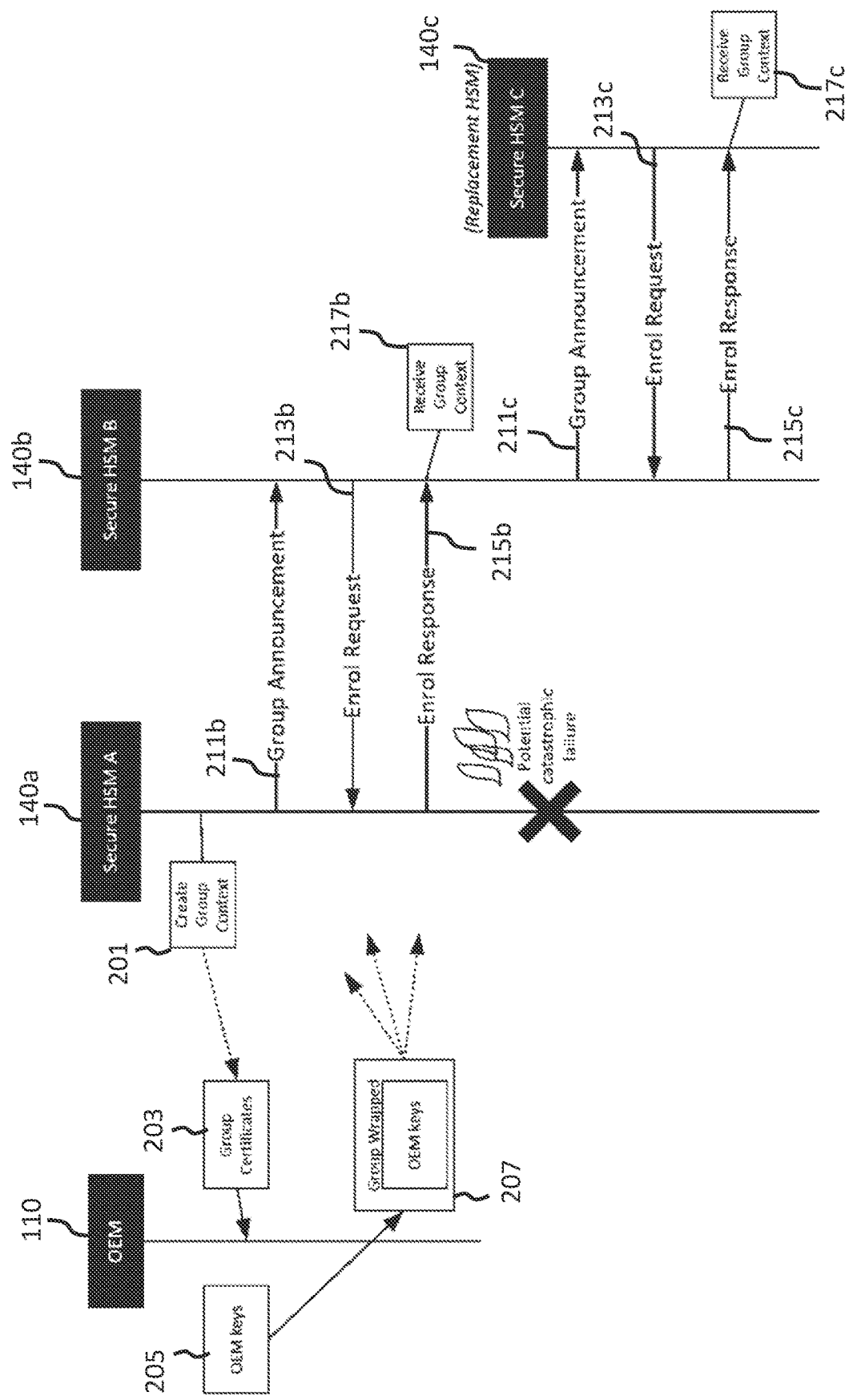
FIG. 2 shows a signaling diagram illustrating in more detail processing steps implemented by a provisioning control apparatus according to an embodiment for enrolling a backup provisioning control apparatus into a group.

As illustrated in FIG. 2, in a stage 211b the first secure HSM 140a sends a "Group Announcement" message to the not yet enrolled further secure HSM 140b. In an embodiment, the "Group Announcement" message may comprise a certificate and/or digital signature of the first secure HSM 140a as well as one or more of the group certificates and/or signatures described above. Based on these one or more certificates and/or signatures the not yet enrolled further secure HSM 140b may verify that the first secure HSM 140a is a genuine product, i.e. trustworthy and the HSM group is a genuine HSM group within the same PKI hierarchy.

In stage 211b shown in FIG. 2 the communication interface 143b of the currently enrolling further HSM 140b receives the "Group Announcement" message. In response thereto, the processing circuitry 141b of the currently enrolling further secure HSM 140b validates that the first HSM 140a is trustworthy and then generates a "Group Enrollment" request, which is transmitted in a stage 213b of FIG. 2 by the communication interface 143b of the currently enrolling further HSM 140b to the first HSM 140a. In an embodiment, the "Group Enrollment" request generated by the currently enrolling further secure HSM 140b may include one of more certificates and/or digital signatures of the currently enrolling further secure HSM 140b, for instance, for proving that it is a genuine, i.e. trustworthy secure HSM. In an embodiment, the one or more certificates contained within the "Group Enrollment" request generated by the currently enrolling further secure HSM 140b may comprise a certificate for a secure wrapping function, i.e. for a key used for the secure wrapping function.

In response to receiving the "Group Enrollment" request the processing circuitry 141a of the first HSM 140a validates based on a certificate and/or digital signature contained within the request that the currently enrolling further secure HSM 140b is trustworthy. If this is the case, the communication interface 143a of the first secure HSM 140a transmits in a stage 215b of FIG. 2 a "Group Enrollment" response to the currently enrolling further HSM 140b. The "Group Enrollment" response comprises the group private keys wrapped only for the currently enrolling further HSM 140b, i.e. using the public key of the currently enrolling further secure HSM 140b. In an embodiment, the "Group Enrollment" response 215b may comprise a digital signature that allows the processing circuitry 141b of the currently enrolling further secure HSM 140b to validate the "Group Enrollment" response 215b. In response to receiving the "Group Enrollment" response 215b the further secure HSM 140b adopts the group and may store the one or more group certificate chains and/or one or more group private keys in the memory 145b for future use as a full member of the group (see 217b).

As a result of the above group enrollment process both the first secure HSM 140a (referred to as "Secure HSM A" in FIG. 2) as well as the further secure HSM 140b (referred to as "Secure HSM B" in FIG. 2) may accept data, such as provisioning job control packages, from the OEM server 110 and use this data for provisioning the electronic chips 170. This is because, in an embodiment, the remote OEM server 110 wraps the secret OEM keys 205 using the group identity keys rather than the public key of the first secure HSM 140a.

As illustrated in FIG. 2, once the further secure HSM 140b has been enrolled by the first secure HSM 140a into the group of secure HSMs, the same enrollment process as described above may be used by the further secure HSM 140b to enroll an additional secure HSM 140c into the group of secure HSMs (see 211c-217c of FIG. 2). Likewise, the additional secure HSM 140c may be enrolled by the first secure HSM 140a.

In an embodiment, the group of secure HSMs 140a-c may be configured to monitor the number of electronic chips 170 provisioned for the OEM. This provides an additional security for the OEM in that an unnoticed cloning of electronic chips 170 with any HSM of the group of secure HSMs 140a-c would not be possible. To this end, in an embodiment, a secure hub entity may be provided to monitor the number of electronic chips 170 managed by each of the secure HSMs 140a-c of a group. In an embodiment, each of the HSMs 140a-c of a group may be part of a different provisioning line for provisioning different batches or types of electronic chips 170. Thus, in an embodiment, each of the secure HSMs 140a-c of a group may be required to request authorization from the secure hub entity to control the provisioning of a specific number of electronic chips 170 by the respective secure HSM 140a-c. To this end, in an embodiment, the HSMs 140a-c are connected with each other over a common network and may check by means of the secure hub entity whether a group product count has been incremented by one of the other HSMs. In an embodiment, the secure hub entity may be a specialized central secure HSM or one of the HSMs of the group of secure HSMs 140a-c that has been assigned a product count before. In such an embodiment, the secure HSM implementing the secure hub entity may apportion its product count for the other specific secure HSMs of the group and transfer the count via a secure message and deduct the count from its overall count so that cloning is not possible.

As already described above, the keys (or other type of data, such as provisioning job control data) wrapped by the remote OEM server 110 for the group of secure HSMs 140a-c may be submitted to any one of the HSMs in the group and it has all the information to provision the electronic chips 170. This renders backups from the secure HSMs 140a-c unnecessary as the provisioning job control data may be stored outside and backed up using normal backup systems. On catastrophic failure of one HSM of the group another HSM of the group may be substituted and take over without the provisioning environment 130 having to go back to the OEM and request re-wrapping its secrets for another HSM. The advantage of this is that whichever HSM 140a-c catastrophically fails that the remaining one may then put out a new "Group Announcement" and enroll an additional secure HSM to replenish the HSMs within the group, as already described above in the context of FIG. 2.

As will be appreciated, the mechanism described above protects against a single failure and allows production to continue. However, this does mean that all secure HSMs of the group must have been granted count to provision electronic devices 170 by the OEM in advance. If the OEM has not supplied all the HSMs of a group with enough credit to get through a defined time period then the factory would come to a halt. This is because the credit is against the individual secure HSM identities, not the group identity. Thus, in a further embodiment, the credit may be raised against the group identity, not the individual HSMs. This requires that the secure HSMs are in contact and are able to reach the secure hub entity at all times to request permission to use a certain requested count (or one or a batch) against the OEM product. As already described above, the secure hub entity may be one of the secure HSMs of the group.

In another embodiment, the credit may be spent by each secure HSM 140a-c requesting a count to be taken from an OEM-set amount using a block-chain mechanism so that each HSM 140a-c can be sure there is enough for it without needing a central authority to arbitrate the count.

In another embodiment, proprietary certificates might be used, rather than standard X.509 certificates. For instance, some certificates may contain two or more public keys, for instance one certificate might contain both a signing and an encryption public key and be signed by a higher-level signing key.

In an embodiment, the secure HSMs 140a-c may be configured to enroll to a single group only. In a further embodiment, one or more of the plurality of secure HSMs 140a-c may belong to more than one group, i.e. multiple groups may be permitted on each secure HSM 140a-c. For instance, in an embodiment, a first group of the plurality of HSMs 140a-c may be associated with a first OEM, while a second group of the plurality of HSMs 140a-c may be associated with a different second OEM. As will be appreciated, this allows different OEMs to have their own groups of secure HSMs 140a-c within the provisioning environment 130, which might be of interest for provisioning electronic components 170 for very security-sensitive equipment of an OEM.

In a further embodiment, the first secure HSM 140a may be configured to enroll only specific further HSMs 140b,c into a group based on a white list of identities of allowed HSMs 140b,c or a black list of non-allowed HSMs 140b,c. In an embodiment, the first HSM 140a may check the identity of the further HSM 140b to be enrolled in the HSM group based on the "Enroll request" message 213b.

Figure 3:
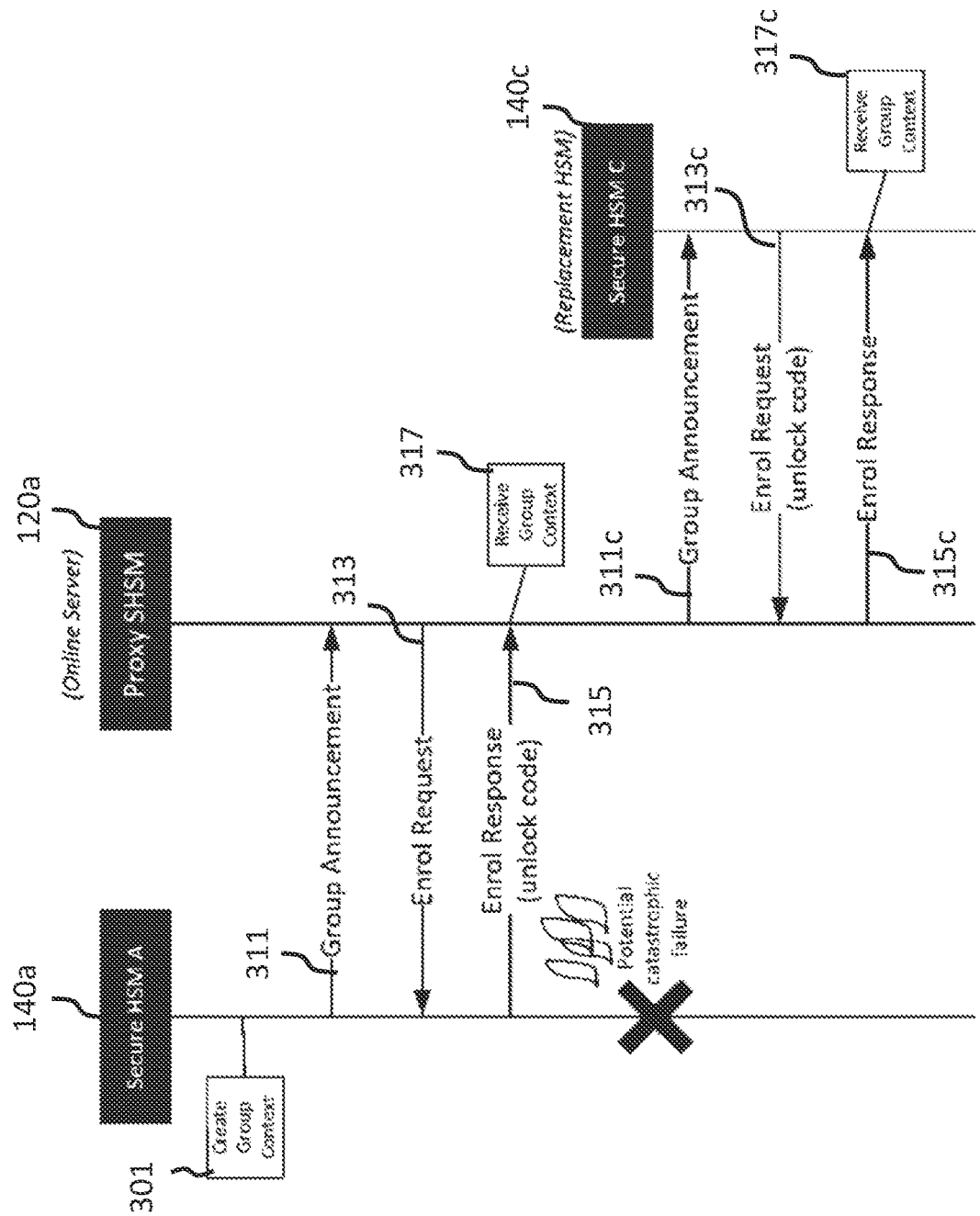
FIG. 3 shows a signaling diagram illustrating in more detail processing steps implemented by a provisioning control apparatus for enrolling a backup proxy provisioning control apparatus into a group.

As will be appreciated, in order to be failsafe a group has to contain at least two secure HSMs 140a-c. This is because the "group enrollment" requires the identity of the further HSM to be received by the first HSM 140. Thus, according to a further embodiment illustrated by 311-315 and 311c-315c in FIG. 3, a proxy secure HSM 120a is provided configured to enroll a second secure HSM 140c into the group, when the first secure HSM 140a is no longer functioning. In an embodiment, the proxy secure HSM 120a may be provided by the remote security server 120.

In an embodiment, the "enroll response" 315 may contain an unlock code provided by the first secure HSM 140a. The unlock code is an additional security measure, so that the first secure HSM 140a (or the entity operating the first secure HSM 140a for provisioning electronic chips 170) can be sure the proxy secure HSM 120a does not provide the group context information to another secure HSM that is not associated with the provisioning environment 130. The unlock code may be used to add another level of encryption to the group context. The group contexts 301 provided by different HSMs to the proxy secure HSM 120a may be archived securely so that they are available in case of a catastrophic failure of the first secure HSM 140a (see 317).

As will be appreciated, a "backup" of the first secure HSM 140a itself becomes generally unnecessary, as it is backup of the job control package from the OEM that becomes most important. However, a backup of the group context may be done from the secure HSM 140a to a remote drive prior to a secure HSM upgrade simply for the purpose of ensuring that a routine software upgrade does not accidentally destroy the group information. Such a backup is encrypted to that HSM and only readable by that HSM. This backup becomes useless if the HSM fails in some way as the HSM individual keys would be lost. This backup is useful if the HSM is recoverable following a problem on upgrade by a further upgrade.

As already described above, embodiments of the present invention allow to group the HSMs 140a-c within a provisioning environment 130 together and to operate the group so that any HSM 140a-c in the group may perform the provisioning tasks. Furthermore, any member of the HSM group may enroll a new HSM to the group. Any HSM 140a-c in the group may perform a backup that can be restored by any other member of the group for use in event of a failure. As already described above, this requires the group to always have at least one active member that can introduce a new HSM into its group.

For allowing to uniquely identify each HSM in the group of secure HSM 140*a-c*, each HSM is configured to implement the identification scheme described in the following under further reference to FIG. 4.

In an embodiment, the group membership may be viewed as a tree branching out from the first secure HSM 140*a* (i.e. the initial trunk) to multiple branches, with any branch capable of creating new branches. Each member HSM receives a simple identity from its parent HSM (the original HSM 140*a* has the identity "1") which is based on the position of its parent in the tree. So, the first new HSM may have the identity "1.1", the second HSM the identity "1.2" and so on. Then if the first new HSM enrolls another HSM, this will have the identity "1.1.1". The outcome is that each HSM receives a designation, i.e. identity that is unique within the tree representing the group of HSMs 140*a-j* without having to know how many new HSMs have been created by other existing HSMs within the group, with whom it has no communications to find out.

Figure 4:
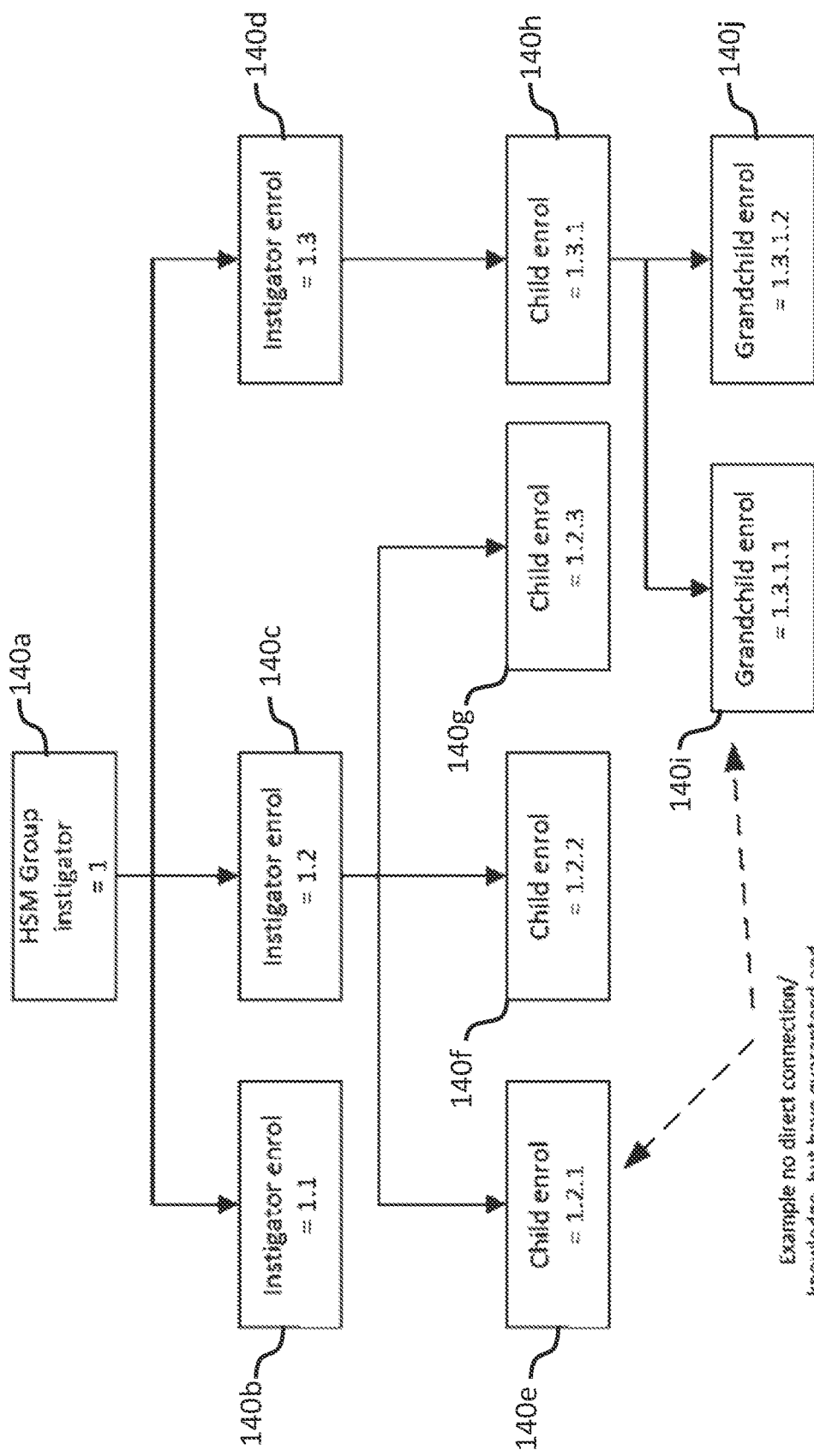
FIG. 4 illustrates the assignment of identities based on a tree or graph structure within a group of provisioning control apparatuses according to an embodiment.

As will be appreciated, by the designation scheme illustrated in FIG. 4 the HSMs 140*a-j* of a group given an identity that is guaranteed to be unique within the group. The unique identity allows operations where it is important the group does the operation once only. Any HSM 140*a-j* of the group has the ability to augment the group with new HSMs, which is useful for instance if the first HSM 140*a* fails, allowing the remaining HSMs to enroll new group members.

Although an HSM in a group may appear exactly the same as any other member, for operations such as logging which is essential for audit checks it becomes possible to identify which specific member of the group performed an operation such as creating a device identity. It also permits providing permission to a specific member of the group to perform provisioning operations that theoretically any HSM would be capable of doing as they all hold OEM private keys via the enrolment process described above.

As will be appreciated, the designations shown in FIG. 4, such as "1", "1.1" and the like, are only options and that other types of designations defining a hierarchical tree structure may be used, such as "a.b.a", "AAC" and the like.

Figure 5:
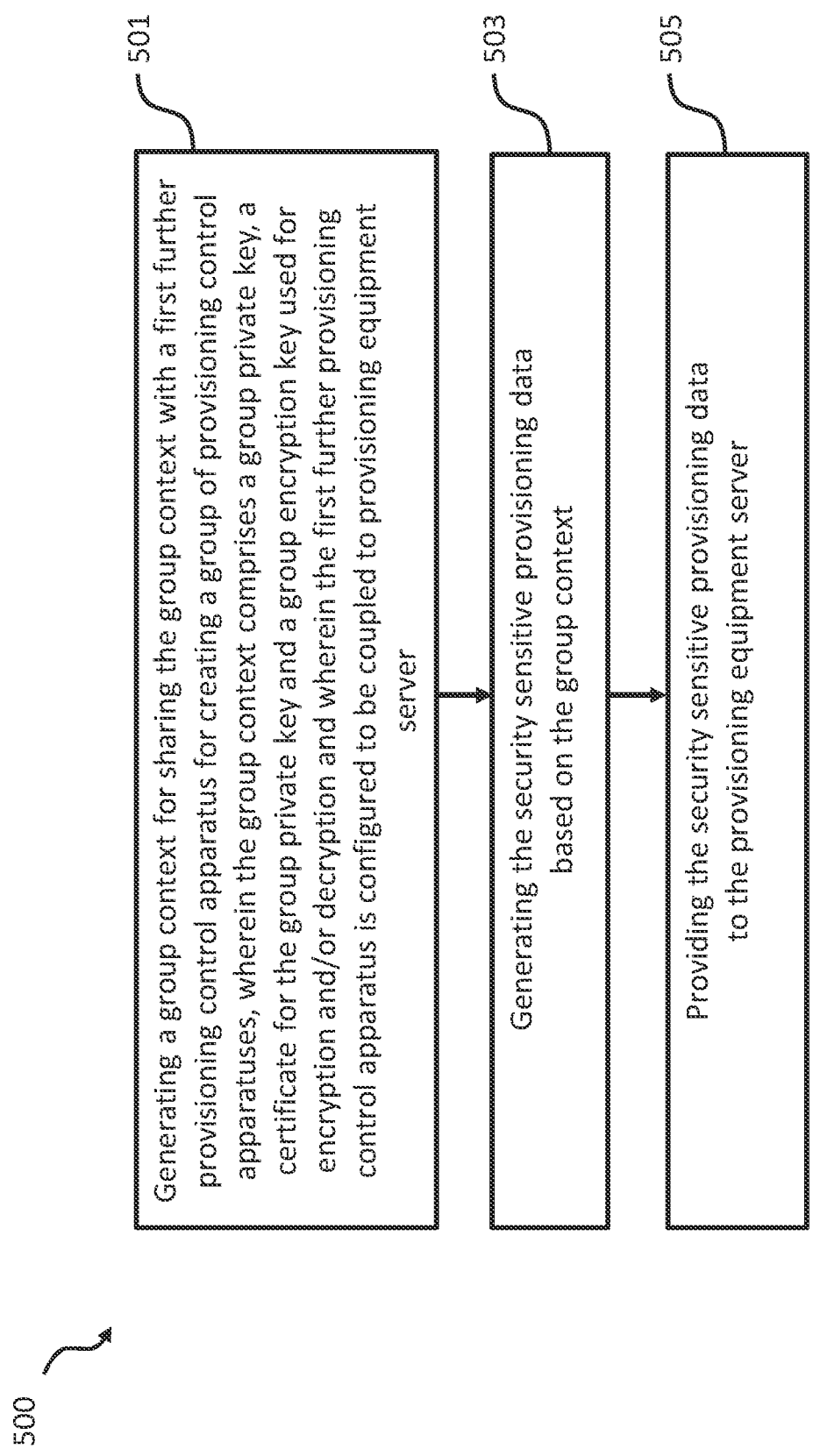
FIG. 5 shows a flow diagram illustrating a method for operating a provisioning control apparatus according to an embodiment.

FIG. 5 shows a flow diagram illustrating steps of a method 500 for operating the provisioning control apparatus 140*a*. The method 500 comprises the steps of:
  generating 501 a group context for sharing the group context with the first further provisioning control apparatus 140*b* for creating a group of provisioning control apparatuses 140*a,b*, wherein the group context comprises a group private key, a certificate for the group private key and a group encryption key used for encryption and/or decryption and wherein the first further provisioning control apparatus 140*b* is configured to be coupled to provisioning equipment server 160;
  generating 503 the security sensitive provisioning data 150 based on the group context; and
  providing 505 the security sensitive provisioning data 150 to the provisioning equipment server 160.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A root or parent provisioning control apparatus configured to be coupled to a provisioning equipment server, the provisioning equipment server being electrically connectable with one or more electronic devices for provisioning the electronic devices with security sensitive provisioning data, wherein the root or parent provisioning control apparatus comprises:
  a processor configured to generate a group context for sharing the group context with a first further provisioning control apparatus for creating a group of provisioning control apparatuses, wherein the first further provisioning control apparatus is a child provisioning control apparatus, wherein the group context comprises a group private key, a certificate for the group private key and a group encryption key used for encryption and/or decryption and wherein the first further provisioning control apparatus is configured to be coupled to the provisioning equipment server;
  wherein the processor is further configured to generate the security sensitive provisioning data based on the group context,
  wherein the root or parent provisioning control apparatus further comprises a communication interface configured to provide the security sensitive provisioning data to the provisioning equipment server, wherein the certificate for the group provate key of the group context chains back to a root certificate of an entity supplying the root or parent provisioning control apparatus and the first further provisioning control apparatus, wherein generating the group context results in a new group certificate chain being created with corresponding private keys, and wherein the communication interface is further configured to receive one or more wrapped OEM keys from a remote OEM server and wherein the processor is configured to unwrap the one or more wrapped OEM keys based on the group context and to generate the security sensitive provisioning data based on the one or more OEM keys.

2. The root or parent provisioning control apparatus of claim 1, wherein the communication interface is further configured to provide the group context to the first further provisioning control apparatus.

3. The root or parent provisioning control apparatus of claim 1, wherein the one or more OEM keys comprise an OEM certificate.

4. The root or parent provisioning control apparatus of claim 1, wherein the communication interface is further configured to provide the group context to a security server for generating a proxy provisioning control apparatus on the security server, wherein the proxy provisioning control apparatus is configured to provide the group context to a second further provisioning control apparatus for enrolling the second further provisioning control apparatus for the group of provisioning control apparatuses, wherein the second further provisioning control apparatus is configured to be coupled to the provisioning equipment server.

5. The root or parent provisioning control apparatus of claim 1, wherein the processor is further configured to assign an identity to the first further provisioning control apparatus, wherein the identity of the first further provisioning control apparatus is indicative of the root or parent provisioning control apparatus and the first further provisioning control apparatus.

6. The root or parent provisioning control apparatus of claim 5, wherein the processor is further configured to assign an identity to a second further provisioning control apparatus, wherein the identity of the second further provisioning control apparatus is indicative of the root or parent provisioning control apparatus and the second further provisioning control apparatus.

7. A child provisioning control apparatus configured to be coupled to a provisioning equipment server, the provisioning equipment server being electrically connectable with one or more electronic devices for provisioning the one or more electronic devices with security sensitive provisioning data, wherein the child provisioning control apparatus comprises:

a communication interface configured to receive a group context from a first further provisioning control apparatus for creating a group of provisioning control apparatuses, wherein the first further provisioning control apparatus is a root or parent provisioning control apparatus, wherein the group context comprises a group private key, a certificate for the group private key and a group encryption key used for encryption and/or decryption; and a processor configured to generate the security sensitive provisioning data based on the group context, wherein the communication interface is further configured to provide the security sensitive provisioning data to the provisioning equipment server, wherein the certificate for the group private key of the group context chains back to a root certificate of an entity supplying the child provisioning control apparatus and the first further provisioning control apparatus, wherein generating the group context results in a new group certificate chain being created with corresponding provate keys, and wherein the communication interface is further configured to receive one or more wrapped OEM keys from a remote OEM server and wherein the processor is configured to unwrap the one or more wrapped OEM keys based on the group context and to generate the security sensitive provisioning data based on the one or more OEM keys.

8. The child provisioning control apparatus of claim 7, wherein the one or more OEM keys comprise an OEM certificate.

9. The child provisioning control apparatus of claim 7, wherein the communication interface is further configured to provide the group context to a security server for generating a proxy provisioning control apparatus on the security server, wherein the proxy provisioning control apparatus is configured to provide the group context to a second further provisioning control apparatus for enrolling the second further provisioning control apparatus in the group of provisioning control apparatuses, wherein the second further provisioning control apparatus is configured to be coupled to the provisioning equipment server for provisioning the electronic devices with the security sensitive provisioning data.

10. The child provisioning control apparatus of claim 7, wherein the communication interface is further configured to provide the group context to a second further provisioning control apparatus for enrolling the second further provisioning control apparatus in the group of provisioning control apparatuses, wherein the second further provisioning control apparatus is configured to be coupled to the provisioning equipment server for provisioning the electronic devices with the security sensitive provisioning data.

11. The child provisioning control apparatus of claim 10, wherein the communication interface is further configured to receive an identity from the first further provisioning control apparatus, wherein the identity of the child provisioning control apparatus is indicative of the child provisioning control apparatus and the first further provisioning control apparatus.

12. The root or parent provisioning control apparatus of claim 11, wherein the processor is configured to assign an identity to the second further provisioning control apparatus, wherein the identity of the second further provisioning control apparatus is indicative of the child provisioning control apparatus, the first further provisioning control apparatus and the second further provisioning control apparatus.

13. A provisioning system comprising:

a root or parent provisioning control apparatus, which includes:

a processor configured to generate a group context for sharing the group context with a child provisioning control apparatus for creating a group of provisioning control apparatuses, wherein the child provisioning control apparatus is a first further provisioning control apparatus, wherein the group context comprises a group private key, a certificate for the group private key and a group encryption key used for encryption and/or decryption and wherein the child provisioning control apparatus is configured to be coupled to the provisioning equipment server;

wherein the processor is further configured to generate the security sensitive provisioning data based on the group context,
wherein the root or parent provisioning control apparatus further comprises a communication interface configured to provide the security sensitive provisioning data to the provisioning equipment server;
wherein the child provisioning control apparatus is according to claim 8; and
a provisioning equipment server being electrically connectable with one or more electronic devices for provisioning the one or more electronic devices with the security sensitive provisioning data,
wherein the certificate for the group private key of the group context chains back to a root certificate of an entity supplying the root or parent provisioning control apparatus and the child provisioning control apparatus, wherein generating the group context results in a new group certificate chain being created with corresponding private keys, and
wherein the communication interface is further configured to receive one or more wrapped OEM keys from a remote OEM server and wherein the processor is configured to unwrap the one or more wrapped OEM keys based on the group context and to generate the security sensitive provisioning data based on the one or more OEM keys.

14. A method for operating a root or parent provisioning control apparatus configured to be coupled to a provisioning equipment server, the provisioning equipment server being electrically connectable with one or more electronic devices for provisioning the one or more electronic devices with security sensitive provisioning data, wherein the method comprises:
 generating a group context for sharing the group context with a first further provisioning control apparatus for creating a group of provisioning control apparatuses, wherein the first further provisioning control apparatus is a child provisioning control apparatus, wherein the group context comprises a group private key, a certificate for the group private key and a group encryption key used for encryption and/or decryption and wherein the first further provisioning control apparatus is configured to be coupled to provisioning equipment server;
 generating the security sensitive provisioning data based on the group context; and
 providing the security sensitive provisioning data to the provisioning equipment server,
 wherein the certificate for the group private key of the group context chains back to a root certificate of an entity supplying the root or parent provisioning control apparatus and the first further provisioning control apparatus, wherein generating the group context results in a new group certificate chain being created with corresponding private keys, and
 wherein the communication interface is further configured to receive one or more wrapped OEM keys from a remote OEM server and wherein the processor is configured to unwrap the one or more wrapped OEM keys based on the group context and to generate the security sensitive provisioning data based on the one or more OEM keys.

\* \* \* \* \*